METHOD OF FABRICATING ORNAMENTAL CONCRETE BLOCKS

Original Filed Sept. 16, 1952 2 Sheets-Sheet 1

INVENTOR.
EDWARD P. RIPLEY
BY
Sellers and Latta
- ATTORNEYS -

METHOD OF FABRICATING ORNAMENTAL CONCRETE BLOCKS

Original Filed Sept. 16, 1952 2 Sheets-Sheet 2

INVENTOR.
EDWARD P. RIPLEY
BY
Fellows and Latta
-ATTORNEYS-

United States Patent Office

Re. 24,527
Reissued Aug. 26, 1958

24,527

METHOD OF FABRICATING ORNAMENTAL CONCRETE BLOCKS

Edward P. Ripley, Van Nuys, Calif.

Original No. 2,708,783, dated May 24, 1955, Serial No. 309,757, September 16, 1952. Application for reissue July 28, 1955, Serial No. 525,091

12 Claims. (Cl. 25—155)

Matter enclosed in heavy brackets [ ] appears in the original patent but forms no part of this reissue specification; matter printed in italics indicates the additions made by reissue.

This invention relates to the manufacture of concrete structural blocks. The general object of the invention is to provide an improved method for fabricating a block having a lateral surface of irregularly bulging contour. Like stone with a chipped finish, such blocks provide a soft, pleasing surface effect in a building wall constructed therefrom, as contrasted to the hard, unattractive finish presented by a conventional flat sided concrete block wall structure.

One of the important objects of the invention is to provide a method for fabricating such structural blocks inexpensively, so that they may be sold competitively. Another object is to provide a method for rapid quantity production of such structural blocks.

Another object is to provide a method whereby such blocks may be fabricated from a wet mix.

A further object is to provide a method for fabricating such blocks, wherein the bulged surfaces produced thereby are irregular and varied so as to avoid any monotonous regularity of recurrence of details of surface design.

In general, the invention contemplates a method for fabricating structural blocks of the type indicated, wherein the blocks are first cast in flat sided rectangular mold cavities, and immediately after removal from the cavities and while the concrete is still green, are slightly compressed between parallel horizontal flat surfaces, down to a reduced thickness of predetermined [, set value] *magnitude,* whereby the blocks are squashed to produce the bulging lateral surfaces thereof.

[The invention contemplates the possibility of delivering the mix directly from a hopper or chute into the mold cavities, eliminating the step of lateral transfer of the mix from the lower end of the hopper to the mold.]

[The invention also contemplates the possibility of molding the blocks directly on a pallet, functioning as the bottom of the mold, with the vibrating action being transmitted through the pallet or through the mold frame.]

Another object is to provide a method and apparatus whereby a series of slumped blocks may be fabricated in a high production operation in which the blocks are molded, slumped and cured.

One of the important aspects of the invention is the provision for molding, slumping, transporting and curing the blocks while they remain in a uniformly upright condition, avoiding any necessity for turning the blocks over between the molding operation and the slumping operation. This provides for high speed, high quantity production in which the molding operation may be carried out on a more or less automatic, high capacity machine, and in which the slumping operation may be immediately performed at the discharge end of such machine, by apparatus which may be either attached to said discharge end of the machine or separate therefrom but located adjacent such discharge end.

Other objects will become apparent in the ensuing specifications and appended drawings in which.

THE APPARATUS

Figures 1, 2, 3, 4:
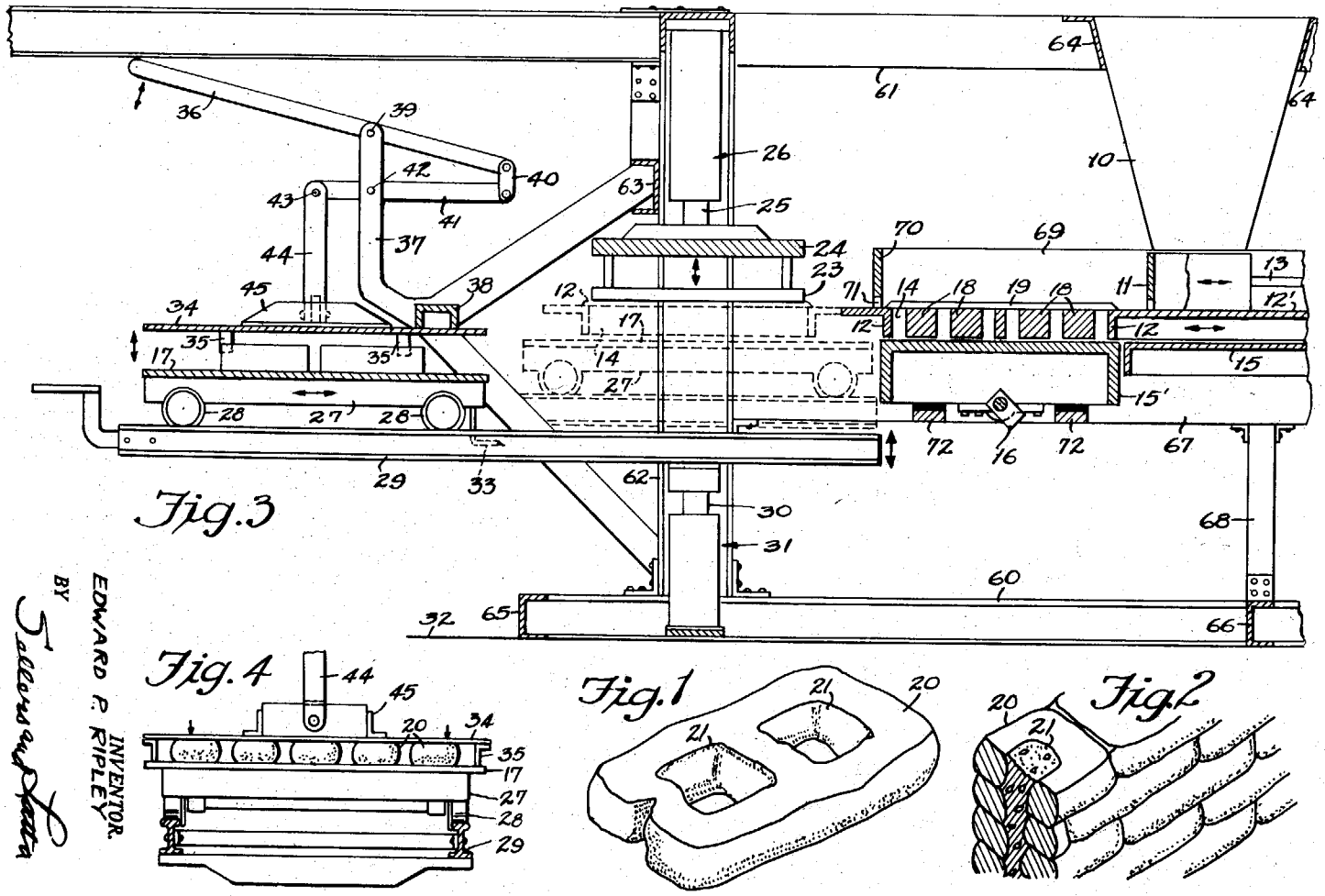
Fig. 1 is a perspective view of a block fabricated through the use of the invention.
Fig. 2 is a perspective view of a wall constructed from said blocks.
Fig. 3 is a side view, partially in section, of the molding portion of an apparatus that can be used in practicing the invention.
Fig. 4 is a detail view of a portion of the apparatus showing the compression operation; partially in section, indicated by line 4—4 of Fig. 3.

The method of the present invention may be practiced by the use of various apparatus. By way of illustration of one apparatus that can be employed in the practice of the method, I have shown an apparatus incorporating certain features of conventional block molding apparatus, which are illustrated somewhat in skeleton form, for the sake of simplicity. The apparatus includes a hopper 10 through which a green concrete mix, "wet" in consistency, is delivered to a feeder 11. Feeder 11, travelling on a flat horizontal apron 12' of a mold frame 12, is moved back and forth along the longitudinal axis of the machine, by suitable drive mechanism (not shown), movement being transmitted to the feeder 11 by a push rod 13.

Mold frame 12 is located at one end of apron 12', and is offset horizontally from hopper 10. Mold frame 12 has a series of mold cavities 14 therein, into which the green concrete is deposited by the feeder 11 as the latter moves leftwardly as viewed in Fig. 3. Below the mold frame 12, and forming a bottom therefor, is a bed 15 having a separate vibrator portion 15' to which is connected an unbalanced, rotating vibrator 16. Vibrator 16 is driven by a suitable source of power (not shown) and functions to cause the green concrete to flow into the mold cavities 14 and to be compacted therein.

The mold frame 12 is slidable horizontally over the [vibrator] *bed* 15, from the receiving position shown in full lines in Fig. 3 in which it is ready to receive concrete from feeder 11, to a discharge position shown in dotted lines in Fig. 3, in which position it is ready to release the green blocks from mold cavities 14 onto a pallet 17.

Forming part of the mold frame 12 is a core assembly including a series of core blocks 18 which are supported upon core bars 19 bridging longitudinally across the cavities 14. The core-blocks 18 function to form in the green blocks 20, mortar spaces 21 (Fig. 1). Core bars 19, being located above or flush with the top plane of mold cavities 14, allow the formation of blocks which are completely closed around the cavities 21, and do not interfere with the downward discharge of the blocks from the mold frame.

Above the discharge position of mold frame 12 is an ejector unit comprising a series of ejector bars 23 which are mounted on an ejector head 24 in laterally spaced relation corresponding to the spacing of the mold cavities 14, each ejector bar 23 registering with a respective mold cavity. Ejector head 24 is attached to the lower end of a piston rod 25 forming part of a hydraulic jack 26, the latter having an overhead suspension in the frame of the apparatus. Ejector head 24 is adapted to be moved vertically by jack 26, with a downward movement for pushing the green blocks out of the mold cavities 14 onto the pallet 17; and with an upward movement to withdraw the ejector bars 23 from the mold cavities 14 so as to allow the mold frame 12 to be returned to the receiving position. These vertical movements are indicated by the double arrow in Fig. 3.

In the molding and ejecting operations, and in the slumping operation which will shortly be referred to, the pallet 17 is carried by a cart 27 having wheels 28 travelling on rails 29 extending longitudinally of the machine. Rails 29 are mounted, for vertical movement, upon a piston rod 30 forming part of a hydraulic jack 31 the lower end of which is supported in the frame of the machine near the ground level indicated at 32 in Fig. 3. Cart 27 is coupled to suitable actuating mechanism (not shown) through a hitch 33, for movement from the receiving position, in which cart is shown in doted lines to a slumping position, in which the cart is shown in full lines. In the receiving position, the track 29 is elevated so as to present the cart to the lower side of mold frame 12 with the upper face of pallet 17 just clearing the lower side of the mold frame. This elevated position is indicated in dotted lines in Fig. 3. In the lowered position, shown in full lines in Fig. 3, the track 29 provides for movement of the cart 27 longitudinally from the receiving position to the slumping position in which the cart is shown in full lines.

In the slumping position, the blocks 20 are supported, stationary, by the pallet 17 (Fig. 4) while downward pressure is applied to the upper faces of the blocks 20 by means of a horizontal slumping plate 34, moving downwardly to a level disposed a predetermined small distance below the original plane of the upper faces of the blocks. This terminal level of the slumping plate 34 in its downward movement is accurately determined by the engagement of stop fingers 35 projecting downwardly from the side margins of the slumping plate 34 and engaging against the upper face of pallet 17 in marginal areas thereof outside the area occupied by the blocks 20. As a result of this slumping operation, the blocks 20 are squashed or slumped to a thickness which may range from ½ to ⅞ of their original thickness, their side faces being bulged outwardly as indicated in Figs. 2 and 3. There will be a corresponding inward bulging of the inner faces of the blocks defining the mortar spaces therein, partially obstructing the spaces but not completely closing them. This inward bulging is not aimed at, but is not undesirable. It is simply an incident of the bulging of the outer faces of the block which is the primary object of the present invention.

For lowering and raising the slumping plate 34, we provide operating mechanism, which, in the particular apparatus disclosed, is manually operated, and includes an operating lever 36 near the rear end of the main body of the machine. While any suitable linkage for mounting levers 36 and transmitting movement therefrom to the slumping plate 34, may be employed, we have shown, by way of example a fulcrum bracket 37 attached to a transverse member 38 of the frame of the machine, the lever 36 being pivoted at 39, intermediate its ends, to the upper end of bracket 37 and its forward end being pivotally connected, through a link 40, to a walking beam 41 which is pivoted at 42 to bracket 37 somewhat below the pivot 39; the rear end of walking beam 41 being pivoted, at 43, to a downwardly projecting link 44 attached to the head 45 of slumping plate 34. This linkage is such that downward movement of lever 36 will result in downward movement of reduced amplitude, of slumping plate 34, there being a corresponding leverage multiplication which makes it easy for the operator to execute the slumping operation manually. The raised position of slumping plate 34 may be determined by the engagement of the upper face thereof against the under side of transverse frame member 38, as indicated in Fig. 3. The vertical up and down movements of slumping plate 34 are indicated by a double arrow in Fig. 3.

Figure 5:
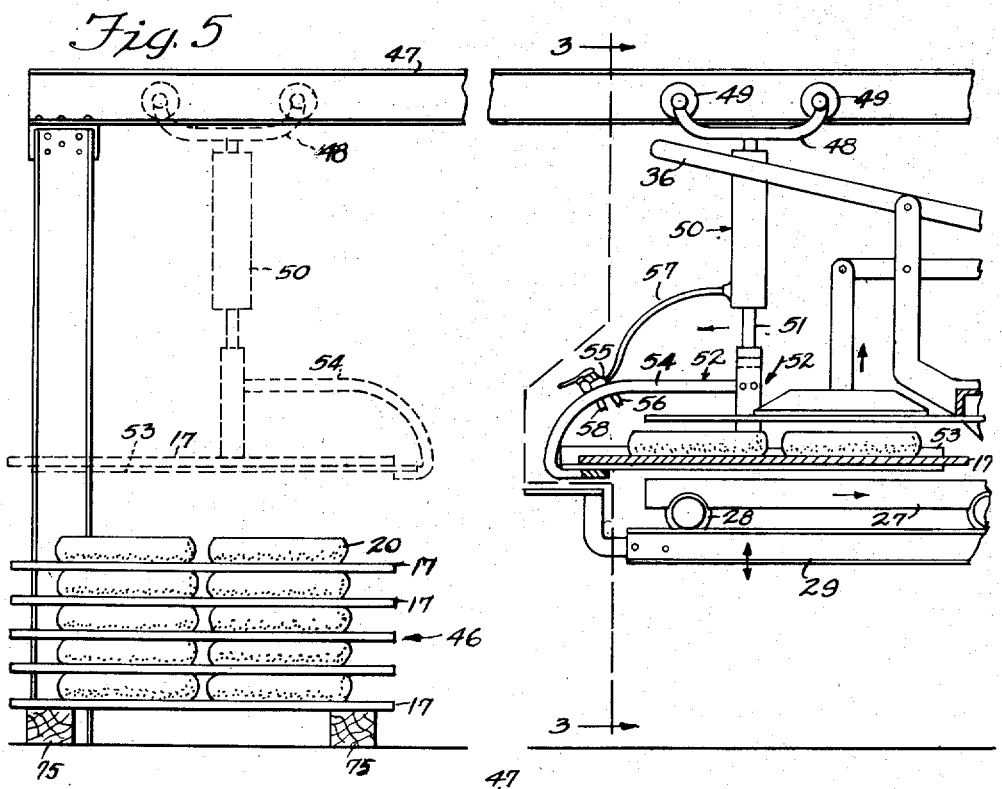
Fig. 5 is a side view, partially in section, of the delivery end of the apparatus, illustrating the operation of stacking the blocks for curing.

Referring now to Fig. 5, which shows the rear end portion of the apparatus including a portion of that which is shown in Fig. 3, each pallet load of blocks, after the slumping operation, is transferred from the track 29 to a stack of pallets which is indicated generally at 46 in Fig. 5. In this connection it may be noted that a pallet 17 while being carried by cart 27, simply rests loosely thereon, with its side margins projecting laterally beyond the side margins of the cart as indicated in Fig. 5. This makes it possible to engage these projecting side margins of the pallet 17 to lift the same from cart 27 and move it over to the stack 46.

Figure 6:
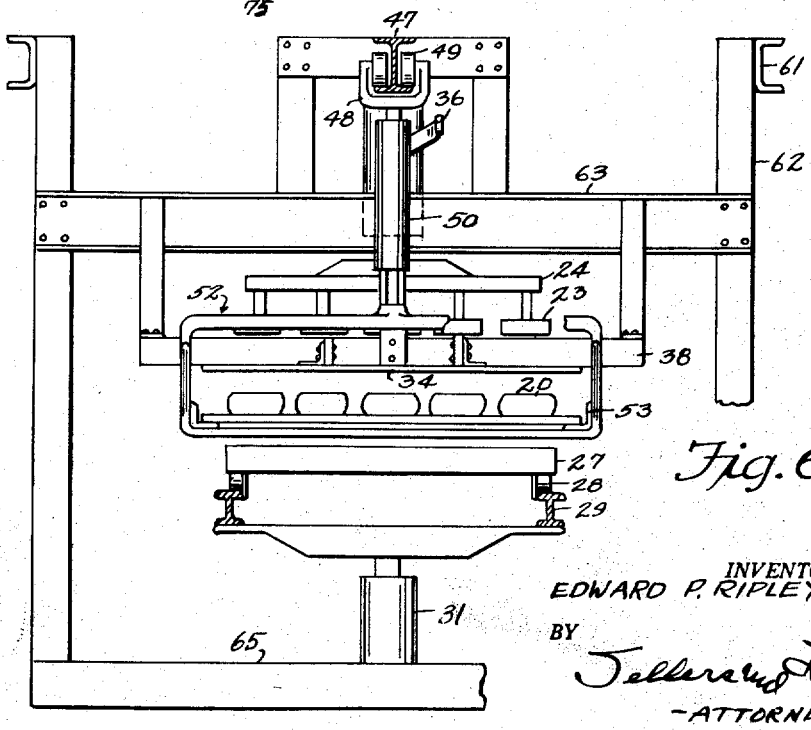
Fig. 6 is a rear end view of the apparatus, partially in section as indicated by line 6—6 of Fig. 5.

For thus transferring the pallets from the cart to the stack, we provide the following mechanism: an overhead rail 47, disposed in the central vertical longitudinal plane of the machine, supports a transfer carriage 48 having rollers 49 travelling on the rail 47. The upper end of a hydraulic lift 50 is suspended from carriage 48, piston rod 51 of the lift 50 having its lower end attached to a lifting fork 52. Lifting fork 52 has a pair of parallel horizontal arms 53 which may be of angle iron as shown, the vertical flanges thereof being spaced sufficiently to freely clear the side margins of pallet 17, and the horizontal flanges thereof projecting toward each other to engage beneath the side margins of the pallet as indicated in Fig. 6. A pair of hand rails 54 serve as handles which may be grasped by an operator and used for manipulating the transfer mechanism. The rollers 49, travelling on rail 47, provide for movement of the transfer unit longitudinally of the machine from the slumping position to a position over the stack 46, whereas the piston rod 51, which is rotatable in the cylinder of lift 50, allows the fork 52 to be swiveled about a vertical axis so that it may be turned to any angular position. Thereby it becomes possible to position the fork facing toward the forward end of the machine so that the arms 53 may be inserted beneath the side margins of a pallet resting on cart 27 in the slumping position, and may subsequently be rotated 180° so as to face toward the rear end of the machine. The fork may then be lowered over the stack 46 until the pallet is brought to rest upon the upper faces of the upper tier of blocks 20 in the stack 46, and may then be withdrawn toward the forward end of the machine so as to leave the new tier of blocks and its supporting pallet resting on the top of the stack 46. The lift 50 provides for vertical movement of the fork 52 as indicated by the double arrows in Fig. 5.

Any suitable manual control, convenient to the operator as he manipulates the fork 52, for controlling the hydraulic actuation of lift 50 may be utilized. For example, there is shown a manually operated valve 55 having a two way action for controlling the flow of fluid through a delivery line 56 from a suitable pressure source (not shown) and thence to a connecting line 57 into the lift 50 for raising the fork 52; and, in its alternate position, providing for return flow of fluid through connecting line 57 to a return line 58 and thence back to a fluid reservoir (not shown). Thus the operation of the transfer unit is completely under the manual control of the operator at all times.

The frame structure of the machine may include any suitable means for supporting the various parts hereinabove described. The entire frame structure is not illustrated herein, but sufficient structure is shown to indicate in general the connection between the parts. The frame structure may include a pair of bolsters 60, a pair of head rails 61, bolsters 60 and head rails 61 being disposed at the respective sides of the machine and extending longitudinally; suitable uprights including a pair of rear posts 62, connecting the bolsters 60 and the head rails 61; together with suitable transverse connecting members 63, 64, 65, 66 etc. Hopper 10 is disclosed as being suspended from cross members 64. Mold frame 12 is slidably mounted on bed 15 which may be supported between intermediate longitudinal bolsters 67 (Fig. 3). The latter may be carried by uprights including rear posts 62 and forwardly disposed posts 68.

Feeder 11 and mold frame 12 are slidably mounted between ways 69 which extend downwardly to the level of bed 15 and which project upwardly above mold frame 12 sufficiently to form a retainer wall around the loading space above vibrator *bed* 15', to prevent loss of loose excess cement which may be left behind when the mold frame 12 is projected to the delivery position. A strike-off plate 70 extends between the forward ends of ways 69, its lower edge just clearing the upper surface of mold frame 12 so as to strike off all excess cement as the mold frame leaves the loading space, said excess remaining on apron 12' until the next charge of cement is delivered to the mold frame.

In the lower side of strike-off plate 70 are a plurality of notches 71 through which the core bars 19 pass as the mold frame is advanced to its discharge position.

Vibrator *bed* 15' may be mounted with some resiliency so as to be free to vibrate. In Fig. 3, parts 72 are intended to provide such resilient support for the vibrator *bed* 15'.

It is to be understood that the slumping unit may be modified in various respects. For example, instead of the stop fingers 35, attached to the slumping plate, it would be possible to incorporate stop means elsewhere in the unit (e. g. in the actuating mechanism above the slump plate). Also, the invention contemplates the possibility of mechanizing the slumping unit for power actuation instead of the manual actuation illustrated.

THE METHOD

My improved method of fabricating structural blocks embodies, in general, the following steps:

1. The utilization, for the molding of the blocks, of a moderately wet, homogeneous mix, adapted to attain a high degree of compactness and density through vibration.

A concrete mix is prepared in a conventional mixing machine, which is not illustrated. Instead of the usual mix employed in the manufacture of concrete blocks, we utilize, for the present process, a mix having a considerably higher content of fines (sand, fine pumice, etc.), and a lower content of the coarser aggregate (gravel, crushed rock, coarse pumice, cinders, etc.) customarily used. For example, the percentage, by volume, of fines may range between 60 percent and 100 percent, while the percentage, by volume, of coarse aggregates, may range from none to 40 percent.

A higher percentage of water than that customarily employed in the manufacture of concrete blocks, is added to the dry ingredients, so as to produce a moderately "wet" mix. The resulting mix has a high degree of homogeneity, plasticity, coherence, and resistance to crumbling during the slumping operation. The mix as thus prepared, is delivered to hopper 10 by any suitable conveyor means (not shown).

2. In the next operational step, the concrete mix is molded, under vibration, in the mold frame which imparts to the blocks their general shape, but with flat, squared sides and ends.

In the operation of the particular apparatus shown herein, to accomplish this step of the method, feeder 11 is moved toward strike-off plate 70 while mold frame 12 is disposed in the retracted, loading position shown in full lines, above vibrator *bed* 15' which forms a bottom therefor, and the vibrator device 16 being in rotation to vibrate the vibrator *bed* 15' as the cement is pushed and dropped into the mold cavities 14 by the feeder 11. After delivering the fresh cement to the mold cavities 14, and while the vibrating process continues, feeder 11 is retracted back to its starting position shown in full lines in Fig. 3, withdrawing a portion of the excess concrete lying above the level of the upper face of the mold frame 12.

3. In the next operational step, the blocks are transferred from the mold frame to a pallet upon which they are subsequently transported, further processed and handled, and cured.

While the feeder 11 is being retracted to its starting position, and while the track 29 is in the lowered position shown in full lines in Fig. 3, cart 27 is retracted from the slumping position shown in full lines to a position below the receiving position shown in dotted lines. Track 29 is then raised, by operation of hydraulic jack 31, to bring the upper face of pallet 17, on cart 27, to the level of the upper face of vibrator *bed* 15'. One end of pallet 17 is positioned closely adjacent the vibrator *bed* 15', so that the green blocks may be slid off the vibrator and onto the pallet 17 without crumbling or sagging. As soon as the cart has reached the receiving position, the mold frame 12 is moved rearwardly to its delivery position shown in dotted lines, placing the blocks in a centered position above pallet 17. The mold frame is then held stationary in this position while the track 29 and ejector units 23, 24 are simultaneously moved downwardly, the ejector bars 23 pushing the green blocks 20 out of the mold cavities 14, until the blocks become entirely detached from the mold frame and rest upon the pallet 17. The downward movement of the track 29 is continued until it reaches the lowered position shown in full lines.

Thereafter, the cart 27 is shifted toward the rear of the machine to the slumping position shown in full lines, and the mold frame 12 is retracted to the loading position shown in full lines in Fig. 3.

4. In the next operational step, the blocks, while still supported upon the pallet, are subjected to controlled pressure from the slumping plate, to squash them into the form in which their sides are rounded, a minimum limit of thickness, arrived at in this slumping operation, being rigidly observed.

When the cart has reached the slumping position, and while a fresh charge of concrete mix is being delivered to mold frame 12, the operator manually lowers slumping plate 34 against the blocks 20 carried by the cart 27, as indicated in Fig. 4. The blocks are squeezed downwardly, their thickness being reduced to a pre-determined minimum determined by the engagement of stop fingers 35 against pallet 17.

5. In the next step of the process, the green blocks, in their slumped form, still supported upon the pallet, are removed from the cart and are placed in a curing stack. Briefly reviewing this operation which has previously been described, the operator manually manipulates the transfer fork 52 to engage the arms 53 thereof beneath the side margins of pallet 17, lifts the pallet, moves it away from the track 29, rotates the fork to a position where it may be withdrawn after the pallet has been deposited on top of the stack 46, then lowers the new pallet upon the upper tier of blocks 20 in stack 46, and then withdraws the fork 52.

When the stack 46 has reached a maximum height determined by the maximum height to which fork 52 can be raised, a transport truck with a fork lift (not shown) is moved up to the stack 46, its fork is inserted beneath the lowermost pallet 17, and the entire stack is lifted and then transported to a curing yard removed from the block making apparatus. In order to facilitate the insertion of the fork beneath the lowermost pallet 17, the latter is supported upon spaced blocks 75 in the stack 46, the blocks 75 remaining to receive the next stack of pallets. In the curing yard, the stack may be lowered upon similar spaced blocks, to facilitate withdrawal of the transfer truck from beneath the lowermost pallet. The blocks are then allowed to cure, in the stack, until they have become set and hard.

The term "structural," as used herein, is intended to have a broad meaning embracing both structural blocks (as the term is conventionally used in the art) and veneer blocks.

In conclusion it may be said that outstanding characteristics of the process of this invention is its ability to produce concrete blocks with an infinite number of variations of surface texture between blocks coming successively out of the same mold, or, to state it somewhat differently, it assures that no two blocks will be identical due to the [combination of wet mix and series of mold cavities with irregularly varying protuberances therein.] *unrestrained bulging of the sides thereof that are to be exposed in the building structure.*

I claim:

1. Steps in a method of fabricating concrete structural blocks with irregularly rounded side faces, comprising: preparing a concrete mix; utilizing said mix in molding a series of green blocks in approximate form but with flat squared sides; placing the green blocks on a flat supporting surface; applying pressure through a flat surface parallel to said supportirng surface, to the upper faces of the blocks while at least one side of each block is unconfined, to reduce the thickness of the blocks and simultaneously cause the unconfined sides thereof to bulge solely as the result of said application of pressure so as to assume the desired irregularly curved contours; and then allowing the blocks to cure.

2. Steps in a method of fabricating concrete structural blocks with irregularly rounded side faces, comprising: preparing a concrete mix of moderately wet consistency and having a high degree of fines so as to maintain a high coherence during the subsequent processing of the blocks; settling a quantity of the mix in a mold to form a series of green blocks having the approximate form of the finished blocks but with flat squared sides; placing the green blocks on a flat supporting surface; applying pressure through a flat surface parallel to said supporting surface, to the upper faces of the blocks while at least one side of each block is unconfined, so as to reduce the thickness of the blocks and cause their unconfined sides to bulge to the desired irregularly rounded contours solely as the result of said application of pressure; and then allowing the blocks to cure.

[3. Steps in a method of fabricating concrete structural blocks with irregularly rounded side faces, comprising: molding green blocks in the approximate shape of the finished blocks but with flat squared sides; placing the green blocks on a flat supporting pallet; placing the pallet beneath a flat slumping plate parallel to the pallet, and moving the slumping plate downwardly against the blocks while at least one side of each block is unconfined, to reduce their thickness and cause them to slump solely as the result of said application of pressure, and thereby to assume the rounded irregular side face contour; and then allowing the blocks to cure, while continuing to support them upon the pallet.]

4. Steps in a method of fabricating concrete structural blocks with irregularly rounded side faces, comprising: preparing a concrete mix of moderately wet consistency and having a high degree of fines, so as to maintain a high degree of coherence in the green molded blocks; molding the green blocks in the approximate form of the finished blocks but with flat squared sides; placing the green blocks on a flat supporting pallet; transporting the pallet to a position beneath a flat slumping plate parallel to the pallet, and moving the plate downwardly and applying pressure therethrough to the upper faces of the blocks while at least one side of each block is unconfined to reduce the thickness of the blocks to cause them to slump solely as the result of said application of pressure, and thereby to attain the desired irregularly rounded side face contour; and then allowing the blocks to cure while remaining supported upon the pallet.

5. Steps in a method of fabricating concrete structural blocks with irregularly rounded side faces, comprising: preparing a concrete mix of moderately wet consistency and having a high degree of fines so as to maintain a high coherence in the subsequent processing steps; using said mix to mold a series of blocks each having the approximate form of the finished block but with flat squared sides; placing the blocks on a flat supporting pallet maintained in a horizontal position; transporting the pallet to a position beneath a flat horizontal slumping plate; moving the slumping plate downwardly into engagement with the upper faces of the blocks and applying pressure thereto while at least one side of each block is unconfined, to reduce the thickness of the blocks and cause them to slump solely as the result of said application of pressure, and to bulge the unconfined side faces thereof into the desired irregularly curved contour; lifting the slumping plate from the blocks and transporting the pallet, with the blocks thereon, to a previously established stack of pallets each having a tier of blocks supported thereon, and lowering the new pallet upon the top of the stack so as to rest upon the upper faces of the blocks of the previously top tier of said stack; transporting said stack to a curing area and setting it down; and allowing the blocks to cure in said stack.

6. Steps in a method of fabricating concrete structural blocks with irregularly rounded side faces, comprising: preparing a concrete mix of moderately wet consistency and with a high degree of fines so as to maintain a high coherence during the subsequent processing of the blocks; inserting a charge of said mix into a mold and vibrating the mix in the mold to shape therein a series of green blocks having the approximate form of the finished blocks but with flat squared sides; moving the green blocks from the mold onto a flat horizontal pallet; transporting the pallet to a position beneath a flat horizontal slumping plate and supporting it in a fixed position therebelow; moving said slumping plate downwardly into contact with the upper faces of the blocks on the pallet and causing it to apply compression to the blocks while at least one side of each block is unconfined to reduce [their] *the* thickness *of the blocks* and cause the side faces thereof to bulge solely as the result of said compression and thereby to attain the desired irregularly curved contour; lifting the slumping plate out of contact with the blocks; moving the pallet with the slumped blocks thereon, away from the slumping plate and over a previously deposited stack of pallets each supporting a tier of green slumped blocks thereon; lowering the pallet onto the upper tier of said stack and leaving it supported upon said upper tier; and then transporting said stack of blocks to a curing area, setting it down and allowing the blocks to cure in the stack.

7. Steps in a method of fabricating concrete structural blocks with irregularly rounded side faces, comprising: preparing a concrete mix of moderately wet consistency and having a high degree of fines so as to maintain a high coherence in the ensuing processing operation; delivering a charge of said mix into a mold having a substantially stationary bottom and a horizontally movable mold frame over said bottom; vibrating said bottom so as to settle the concrete into said mold and thereby form a series of green blocks having the approximate form of the finished blocks but with flat squared sides and somewhat greater thickness; moving a supporting pallet, in a horizontal position, up to one end of said mold, on a level with said bottom; moving said mold frame laterally so as to slide the blocks off of said bottom onto said pallet; moving said pallet downwardly and then transporting it horizontally to a position beneath a horizontal flat slumping plate, and supporting it below said plate with at least one side of each block unconfined; moving said slumping plate downwardly into contact with the upper faces of the blocks supported on said pallet and applying pressure thereto to slump said blocks to a reduced thickness, thereby causing the unconfined sides of the blocks to bulge to the desired irregularly rounded contour solely as the result of said application of pressure; lifting the slumping plate away from the blocks; moving said pallet on to a position above a previously deposited stack of pallets each having a tier of green slumped blocks supported thereon; lowering said pallet and depositing it upon the upper tier of blocks in said stack; moving the stack of blocks to a curing area and setting it down; and allowing the blocks to cure in the stack.

[8. Steps in a method of fabricating concrete structural blocks with irregularly rounded side faces, comrising: molding green blocks in the approximate shape of the finished blocks but with flat squared sides; supporting the green blocks on a flat horizontal surface with at least one side of each block unconfined; applying controlled, continuous pressure through a flat plate, maintained parallel to said supporting surface; in a single downward movement of said plate, to the upper faces of the blocks as thus supported to reduce the thickness of the blocks and simultaneously cause the unconfined sides thereof to bulge solely as the result of said application of pressure so as to assume the desired irregularly curved contours; and then allowing the blocks to cure.]

9. Steps in a method of fabricating concrete structural blocks with irregularly rounded side faces, comprising: molding green blocks in the approximate shape of the finished blocks but with flat squared sides; supporting the green blocks on a flat horizontal surface with at least one side of each block unconfined; applying controlled, continuous high pressure through a flat plate, maintained parallel to said supporting surface, to the upper faces of the blocks as thus supported to reduce the thickness of the blocks and simultaneously cause the unconfined sides thereof to bulge solely as the result of said application of pressure so as to assume the desired irregularly curved contours; and then allowing the blocks to cure.

[10. Steps in a method of fabricating concrete structural blocks with irregularly rounded side faces, comprising: molding green blocks in the approximate shape of the finished blocks but with flat squared sides; supporting the green blocks on a flat horizontal surface with at least one side of each block unconfined; applying downward pressure through a flat plate maintained parallel to said supporting surface, to the upper faces of the blocks as thus supported, to reduce the thickness of the blocks and simultaneously cause the unconfined sides thereof to bulge solely as the result of said application of pressure and thereby to assume the desired irregularly curved contours; positively stopping the downward movement of said plate at a fixed distance above said supporting surface so as to establish a predetermined thickness in the finished blocks; and then allowing the blocks to cure, while continuing to support them on said supporting surface.]

[11. Steps in a method of fabricating concrete structural blocks with irregularly rounded side faces, comprising: molding green blocks in the approximate shape of the finished blocks but with flat squared sides; supporting the green blocks on a flat horizontal surface with at least one side of each block unconfined; applying controlled, continuous pressure through a flat plate, maintained parallel to said supporting surface, in a single downward movement of said plate, to the blocks as thus supported, whereby to cause the unconfined sides of the blocks to bulge to the desired irregularly rounded contours; positively stopping the downward movement of said plate at a fixed distance above said supporting surface so as to establish a pre-determined thickness in the finished blocks; and then allowing the blocks to cure, while continuing to support them on said supporting surface.]

*12. Steps in a method of fabricating concrete structural blocks with irregularly rounded side faces, comprising: molding green blocks in the approximate shape of the finished blocks but with flat squared sides; supporting the said green blocks on a pallet with at least one side of each block unconfined; applying downward pressure through a flat plate, maintained parallel to said pallet, in a single downward movement of said plate, to the upper faces of the blocks as thus supported to reduce the thickness of the blocks and simultaneously cause the unconfined sides thereof to bulge solely as the result of said application of pressure so as to assume the desired irregularly curved contours; and then allowing the blocks to cure.*

*13. Steps in a method of fabricating concrete structural blocks with irregularly rounded side faces, comprising: molding green blocks in the approximate shape of the finished blocks but with flat squared sides; supporting the said green blocks on a pallet with at least one side of each block unconfined; applying controlled, continuous high pressure through a flat plate, maintained parallel to said pallet, in a single downward movement of said plate, to the blocks as thus supported, whereby to cause the unconfined sides of the blocks to bulge to the desired irregularly rounded contours; positively stopping the downward movement of said plate at a fixed distance above said pallet so as to establish a pre-determined thickness in the finished blocks; and then allowing the blocks to cure, while continuing to support them on said pallet.*

*14. Steps in a method of fabricating concrete structural blocks with irregularly rounded side faces, comprising: molding, in a mold, green blocks in the approximate shape of the finished blocks but with flat squared sides; discharging the blocks from the mold upon a pallet; transporting the pallet, with blocks supported thereon, from the mold to a position beneath a flat slumping plate, parallel to the supporting face of the pallet; supporting the green blocks on said pallet in said position with the sides of the blocks unconfined while applying continuous downward pressure to the upper faces of the blocks through said slumping plate, in a single downward movement of said plate, to reduce the thickness of the blocks and to simultaneously cause the unconfined sides thereof to bulge solely as the result of said application of pressure so as to assume the desired irregularly curved contours; positively stopping the downward movement of said plate at a fixed distance above said pallet so as to establish a predetermined thickness in the finished blocks and then allowing the blocks to cure.*

*15. Steps in a method of fabricating concrete structural blocks with irregularly rounded side faces, comprising: molding green blocks in the approximate shape of the finished blocks but with flat squared sides; supporting the said green blocks on a pallet with at least one side of each block unconfined; applying controlled, continuous pressure through slumping means having pressure applying areas disposed substantially in a common plane maintained parallel to said pallet, in a single downward movement of said slumping means, to the blocks as thus supported, whereby to cause the unconfined sides of the blocks to bulge to the desired irregularly rounded contours; positively stopping the downward movement of said slumping means at a fixed distance above said pallet so as to establish a pre-determined thickness in the finished blocks; and then allowing the blocks to cure, while continuing to support them on said pallet.*

*16. Steps in a method of fabricating concrete structural blocks with irregularly rounded side faces, comprising: molding green bocks in the approximate shape of the finished blocks but with flat squared sides; supporting the said green blocks on a pallet with the sides of the blocks unconfined; applying downward pressure through slumping means having pressure applying areas disposed substantially in a common plane maintained parallel to said pallet, to the upper faces of the blocks as thus supported to reduce the thickness of the blocks and simultaneously cause the unconfined sides thereof to bulge as the result*

*of said application of pressure so as to assume the desired irregularly curved contours; and then allowing the blocks to cure.*

References Cited in the file of this patent or the original patent.

UNITED STATES PATENTS

| | | |
|---|---|---|
| 65,431 | Ragan | June 4, 1867 |
| 1,754,484 | Pelton | Apr. 15, 1930 |
| 1,944,464 | Richardson | Jan. 23, 1934 |
| 2,526,198 | Clanton | Oct. 17, 1950 |